3,411,363
DIFFERENTIAL PRESSURE TRANSMITTER
Joseph A. Danvic, Lyndhurst, and Peter B. Lewis, Euclid, Ohio, assignors to Bailey Meter Company, a corporation of Delaware
Filed Dec. 1, 1966, Ser. No. 598,441
4 Claims. (Cl. 73—407)

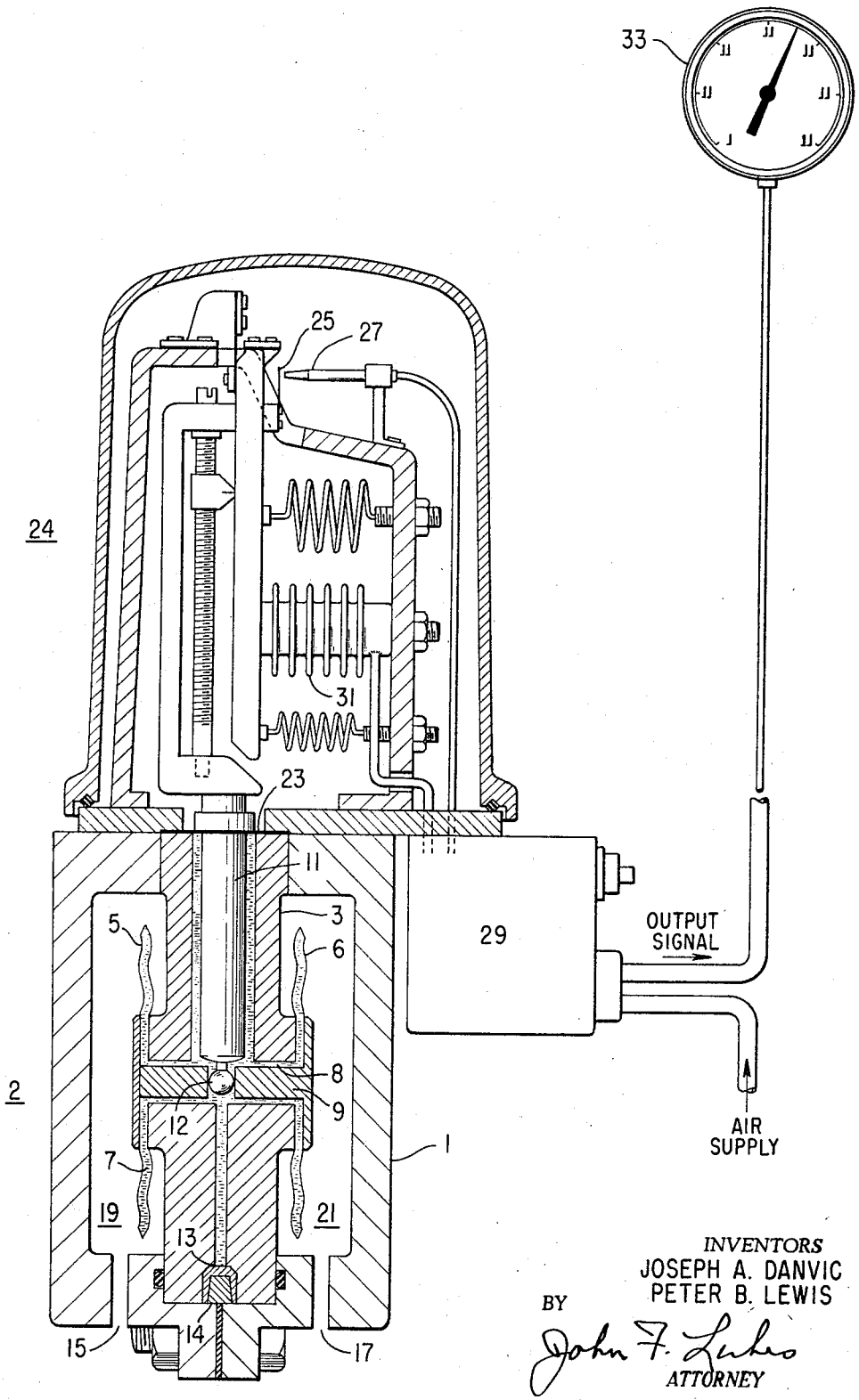

ABSTRACT OF THE DISCLOSURE

A differential pressure responsive device using two chambers, a nesting bellows in each chamber, a bar linking the bellows, and fluid communication between the bellows. The bar has a thermal coefficient of expansion that tends to compensate for the thermal expansion of the fluid. The bar contacts a beam midway between the bellows and thereby transmits the motion of the bar outside the device. There is symmetry in the structure of the device about the beam tending to cancel static pressure error.

---

This invention relates to a differential pressure responsive device, more particularly to a nesting bellows differential pressure responsive device, for use in measuring or controlling pressure differentials.

Conventional industrial force balance methods of monitoring differential pressure commonly consists of either a two-element device or a three-element device. The three-element device is comprised of two sensing elements which are in contact with the process fluid whose pressure differential is to be measured and a differential pressure responsive element not in contact with the process fluid but responsive to the resultant force established by the two sensing elements. The two-element device, which is generally preferred over the three-element device because it is less difficult to manufacture and, therefore, less costly, eliminates the differential pressure responsive element of the three-element device and transmits the resultant force developed by the two sensing elements by means of mechanical linkage.

The two-element device, the improvement of which will be the subject of our invention, is generally a filled system of incompressible fluid with the sensing elements being either of a bellows construction or a diaphragm construction. The advantages and disadvantages of both type of sensing elements will be discussed in reference to our improved pressure differential responsive device. A feature generally provided in said devices is over-pressure protection of the device and said over-pressure protection can be established by either a collapsing-type system or a trapping-type system. The success of the latter type system depends on the perfect sealing off of one sensing element from the other during over-pressure conditions and, therefore, said protective system is inferior to the collapsing system during extended periods of over-pressure.

Our improved pressure differential responsive device incorporates the collapsing type over-pressure protective design in addition to incorporating the advantages of the bellows sensing element and diaphragm sensing element.

The bellows type two-element device is characterized by a central partition having two opposed bellows mounted thereon. These bellows, each consisting of many convolutions, have their interiors in communication with each other and are filled with an incompressible fluid. The free moving, outer ends of the bellows are joined at their centers by a connecting stem. This mechanical connection of the free moving ends cause the bellows to move in unison in response to a pressure differential. Through means of seating surfaces mounted on the stem and mating surfaces on the central partition, the sensing bellows are protected from extreme over-pressure by closing off the communication and trapping the fluid in the respective bellows during periods of extreme over-pressure.

Although the basic principle involved is technically sound, erroneous readings occur as a result of sediment or suspended particles in the process fluid, unequal effective areas of the sensing bellows, temperature fluctuation at the pressure responsive device and fluid leaks at the valve seat during excess over-pressure.

The sensing bellows consist of many convolutions and produces a force equal to the process pressure times the effective area of the bellows which determines the output signal as a function of pressure differential. Therefore, if particles present in the process solution deposit on the surface of the convolutions, the movement of the bellows with changing pressure differential will be restricted resulting in signal error.

When the sensing bellows is experiencing extreme over-pressure, the stem motion causes the seating surface, which is attached to the stem, to seat in the valve seat provided in the central partition. The sealing force established is a function of the fluid pressure and bellows effective area. Regardless of the force, however, it is generally accepted that such a seal will not establish true isolation of the bellow compartments during long periods of over-pressure. Therefore, the leaks occurring in this seat eliminate the intended protective feature whereby over-pressure damage to the bellows would be eliminated.

Since the bellows consist of numerous convolutions, a considerable quantity of incompressible fluid is required to fill completely the internal volume of the bellows. This fluid is sensitive to fluctuations in ambient temperature and will respond to temperature change by a change in volume as is manifested by bellows displacement. Such a displacement is not the result of a change in process pressure and, therefore, is present as an erroneous output.

A typical diaphragm type pressure responsive device often provides collapsing type over-pressure protection. The unit is comprised of a substantially rigid, metal back-up plate and a pair of corrugated metal diaphragms secured at their peripheries to opposite sides of said plate to form a hermetically-sealed unit. The diaphragms are joined at their centers by a stem such that the diaphragms move in unison in response to a pressure change. The back-up plate serves to prevent excessive deflection of the diaphragms since the opposite sides of the back-up plate provide convolutions that conform with the diaphragm corrugations. Therefore, when excess over-pressure exists at a diaphragm, the diaphragm collapses against the back-up plate.

Although this diaphragm unit establishes a positive mechanical method of protecting the sensing element from permanent damage due to over-pressure, it encounters operational problems because of the basic design.

It is not possible to form the convolutions on the back-up plate in such a manner that they conform precisely with the corrugations on the diaphragms. Thus, when the diaphragm is forced against one of the convoluted surfaces by a high over-pressure, it is deformed by the small amount that is necessary to cause it to fit tightly against the convoluted supporting surface. This resulting diaphragm distortion results in signal error.

The diaphragm is a single thickness of metal. The spring rate of such a diaphragm causes it to respond to slight changes in ambient conditions which affect the incompressible fluid and the mechanical linkage. Such sensitivity to variables other than the process pressure differential results in erroneous output signals.

A problem common to both sensing methods is the effect on the output signal caused by changes in process static pressure. In many designs of two-element devices, the force beam is mechanically attached to the pressure responsive device. Any misalignment in the mechanical member will be amplified by a change in static pressure and since the force beam is not free to compensate for this movement, its movement will cause a false indication of a pressure differential. While the amount of error present in the methods discussed may be small, the operation of most force balance systems are such that the normal range of movement is no more than a few thousandths of an inch, and hence, a very small unbalance is sufficient to introduce a significant error in measurement.

An object of the present invention is to provide an improved differential pressure measuring device.

More specifically, the object of the invention is to provide a differential pressure measuring device which is so designed and constructed as to reduce the effect on output signal caused by temperature sensitive incompressible fluid, variation of effective area of sensing elements, changes in static pressure and to improve the over-pressure of the sensing element as well as improving the overall accuracy of the pressure responsive device.

With the foregoing objects in view, which will become apparent in the following description and specifically pointed out in the appended claims, reference is had to the accompanying drawing for an illustrative embodiment of our invention.

Referring to the drawing, we show our differential pressure responsive device mated with a pneumatic transmitter. This typical system includes a differential pressure responsive device, transmitter and pressure indicator. The transmitter 24 responding to a pressure differential sensed by the nesting capsule differential pressure sensor 2 transmits a signal to the indicator 33 which displays a visual indication of the sensed process pressure differential.

While the nesting capsule differential pressure responsive device 2 and other features of the present invention will be discussed in connection with a pneumatic transmitter 24, it will be understood that they are equally applicable to electric transmitters.

In the general operation of the system of FIG. 1, a pressure differential of a process fluid is measured as it would appear, for example, across an orifice plate or a Venturi section. The pressure differential is conveyed through pressure ports 15 and 17 to the sensing capsules 5 and 6. Movement of the sensing capsules 5 and 6, due to variations in the pressure differential is conveyed to one end of a force beam 11. This beam passes through a sealing means, such as a diaphragm 23, which, in addition to sealing the incompressible fluid 7 present in the pressure responsive device, also acts as a fulcrum for the force beam 11. The opposite end of the force beam 11 carries the vane 25 of a vane-nozzle fluid pressure couple. The nozzle 27 of this couple is rigidly fastened to the transmitter housing and a pipe extends from the nozzle to a booster 29.

The vane 25 is maintained in spaced relationship with the nozzle 27 and any change in this relationship causes the output of the booster to change accordingly. The output pressure is fed back to a bellows 31 for restoring the position of the force beam 11 and returning the original relationship between the vane 25 and the nozzle 27. The output pressure is also transmitted to the indicator 33. Under ideal conditions, disturbance of the vane-nozzle relationship and the resulting booster output pressure is the direct result of a change in pressure differential at the sensing capsules 5 and 6.

However, in the prior discussion on conventional pressure responsive devices, it was apparent that extraneous forces are often present which are not the result of a change in pressure differential and the presence of said forces will cause disturbance of the vane-nozzle relationship thereby producing an output pressure which is not an indication of pressure differential.

What we propose is a differential pressure responsive unit which greatly reduces the effect of extraneous forces on the output of the transmitter. To accomplish this objective, we have designed a novel pressure sensing element and an improved means of transmitting the movement of the pressure sensing elements to the transmitter. A detailed description of our pressure sensing element and our overall improvements will be given presently.

*Description of differential pressure responsive device*

The drawing includes a sectional illustration of the differential pressure responsive device 2 as well as a schematic arrangement of its functional use with a pneumatic transmitter in a typical system application. Basically, the structure of the differential pressure responsive device consists of two main housings, the pressure housing 1 and the capsule and force beam housing 3. The capsule and force beam housing 3 includes as integral parts thereof, the nesting sensing capsules 5 and 6, the capsule connecting stem 9, the sealing diaphragm 23, and the force beam 11. This housing also provides a port 13 for filling the internal volume of the differential pressure responsive device with incompressible fluid 7. The assembly of the pressure housing 1 and the capsule and force beam housing 3 form pressure cavities 19 and 21 with their respective pressure ports 15 and 17.

The nesting-type capsules 5 and 6 are each basically a one-convolution bellows consisting of two back-to-back, circular, corrugated diaphragms. The diaphragms are sealed at their peripheries maintaining an internal clearance of about .005 inch between the diaphragms.

The corrugations of the back-to-back diaphragms are such that if the internal clearance of .005 inch is reduced to .000 inch, the diaphragm corrugations will match in such a manner that the capsule surfaces will be considered to be "nesting." It is this nesting feature that provides protection from damage due to over-pressure as will be discussed in the description of operation.

As is apparent from the drawing, the differential pressure responsive unit employs two nesting bellows capsules 5 and 6, one for each of the two pressure cavities 19 and 21 respectively. The capsules 5 and 6 are located at either end of the capsule and force beam housing 3 and are mounted opposing each other. The capsules 5 and 6 are in communication internally by means of a passage 8 in the housing 3. The internal volume is created by the housing passage established by clearance between moving members such as the clearance between the force beam 11 and the capsule and force beam housing 3 as it extends to the sealing diaphragm 23 and the clearance between the capsule connecting stem 9 and the capsule and force beam housing 3. The internal volume thus created is subjected to a high vacuum and subsequently filled with an incompressible fluid, such as silicone, through fill port 13. The volume having been completely filled, fill port cap 14 is inserted thereby maintaining the fluid filled volume. In addition to connecting the opposed capsules hydraulically through the incompressible fluid, the free moving diaphragm surfaces of the capsules are joined mechanically by means of a high expansion alloy connecting stem 9. The connecting stem 9 is attached mechanically to the respective nesting capules 5 and 6. The connecting stem 9 provides a hole midway on its length to accept the sphere 12 of force beam 11. The connecting stem not only insures that the free moving surfaces of the respective capsules will move in unison in response to a pressure differential, but also reduces the effect on the output caused by the temperature sensitivity of the incompressible fluid 7 as will be discussed in the description of the operation.

The force beam 11 is the means of transmitting nesting capsule movement in response to a pressure differential. The force beam is mechanically attached at one end to a sealing diaphragm 23 which acts both as a means of hermetically sealing the fluid filled differential pressure responsive device as well as acting as a fulcrum for the force beam 11. The opposite end of the force beam 11 is not mechanically attached to the connecting stem 9, but rather is in mechanical contact with the stem at the surface of the sphere 12 which is an integral part of the force beam 11. This sphere-in-slot arrangement resulting from the force beam being centrally located in a hole in the connecting stem 9 of the sensing capsules 5 and 6 reduces the erroneous signal caused by fluctuating ambient temperature as well as error caused by changes in static pressure. These improvements will be discussed in detail in the description of the operation of the differential pressure responsive device.

*Description of operation*

Under normal operating conditions, the process fluid enters the pressure cavities 19 and 21 through pressure ports 15 and 17 respectively and contacts the surfaces of the sensing diaphragms of the nesting capsules 5 and 6. The ever-present possibility of sediment or particles depositing on the many convolution bellows of conventional measuring devices, thereby restricting bellow movement is eliminated by the single convolution design of the nesting capsule.

In order to understand more clearly the features and improvements of the invention, a hypothetical situation will be assumed. If the pressure of the process fluid in pressure cavity 19 exceeds the process pressure in pressure cavity 21, the nesting capsule 5 will begin to collapse thereby reducing the internal volume of nesting capsule 5 forcing incompressible fluid from capsule 5 to nesting capsule 6. The diaphragm surfaces of nesting capsule 6 will expand to accept the displaced fluid from capsule 5. The movement of the capsule diaphragms is transmitted to the force beam through the movement of the connecting stem 9. The force beam being pivoted at the sealing diaphragm 23 causes a disturbance of the vane-nozzle relationship in the transmitter 24 which in turn results in a pressure output to the indicator representing the differential pressure.

If the pressure in cavity 19 exceeds the pressure in cavity 21 by an amount greater than the calibrated full range value, then the diaphragm surfaces of sensing capsule 5 nest completely causing the internal volume of the capsule to be zero and forcing the displaced incompressible fluid to flow to nesting capsule 6. By design, nesting capsule 6 is capable of accepting the additional fluid without damaging the diaphragm surfaces. Since diaphragms are of identical thickness and material, close tolerances were maintained during fabrication of the mating surfaces. Therefore, the surfaces of the capsule 5 nest during overpressure conditions without undergoing distortion.

The capsule protection resulting from the nesting surfaces provides a positive enduring protection without concern of leak which would destroy the protective aspect of the design.

When the pressure in the pressure cavities 19 and 21 have equalized, the compressed diaphragms of nesting capsule 5 return to their original position thus allowing incompressible fluid to flow into the volume created by the expansion of the diaphragms which in turn permits the diaphragm surfaces of nesting capsule 6 to return to their normal position.

This restoring movement causes motion in the connecting stem 9 resulting in the force beam re-establishing the position of the vane 25. The transmitter then responds by repositioning the vane 25 and causing a new output to the indicator 33.

The foregoing discussion would apply equally to a reversal of the over-pressure condition bearing in mind the system reactions would also be reversed.

Thus far, we have discussed the operation of the differential pressure responsive device assuming only the effect of process pressure on the device. However, as was pointed out in the prior discussions of conventional measuring methods, the variation in ambient conditions and their affect on materials used in the construction of the differential pressure sensor will often introduce error in the output signal.

The incompressible fluid 7 is sensitive to variation in temperature. The fluid sensitivity to temperature change is manifested by a change in volume. This change in volume in turn causes the free moving capsule diaphragms to move as if responding to a change in pressure differential in the process.

In most two-element designs, prior to our invention, the force beam was connected externally to one end of the connecting stem thus subjecting the output accuracy to the motion developed by one sensing element. Therefore, when a temperature rise would cause the fluid to expand and both elements to expand an equal amount, the force beam sensed only the motion of one element and responded by indicating a false differential pressure. The forces created by temperature change are proportional to the volume of incompressible fluid present. Therefore, it follows that in a bellows device consisting of bellows of many convolutions, said bellows will require a considerable volume of fluid and thereby increase the temperature sensitivity of the differential pressure responsive device.

The subject design as illustrated in FIG. 1 reduces the temperature sensitivity of the differential pressure responsive device by reducing the required volume of incompressible fluid 7, centering the force beam 11 between the sensing capsules 5 and 6 and incorporating high expansion alloys as the material for the connecting stem 9.

The advantages of reducing the volume of incompressible fluid have been discussed as well as the neutralizing effect of centering the force beam. The purpose of the high alloy connecting stem 9 is to reduce the effect of increasing pressure with a temperature change by causing instead a change in volume. The change in volume caused by the temperature sensitive alloy is in fact an increase in capacitance thereby reducing effect of a pressure build-up. The effective area of the two nesting capsules 5 and 6 are matched as close as possible to reduce the error caused by internal pressure build-up as a result of fluid expansion. Having matched the effective areas as close as possible, the error signal present as a result of expansion of the incompressible fluid at an increase in temperature is a function of pressure drop across the sensing diaphragms. This error signal is represented by the equation:

$$E = (A_1 - A_2)(\Delta P)$$

where:

$E$ = error force
$A_1$ = effective area of nesting capsule 5
$A_2$ = effective area of nesting capsule 6
$\Delta P$ = pressure differential across sensing diaphragms.

The pressure differential factor in the above equation is minimized by the high expansion alloy connecting stem 9 which responds to temperature by expanding, thus forcing the capsule diaphragms to increase their internal volume. The increase in the internal volume will enable the capsule assemblies to accept the volume increase of the incompressible fluid. The action of the connecting stem also prevents distortion of the diaphragms due to internal pressure build-up.

There remains a discussion of the effect on output signal caused by changes in static pressure. A change in static pressure occurs when the pressure in cavities 19 and 21 increase or decrease a like amount simultaneously. Such changes often cause a slight movement at the sealing diaphragm 23 and in prior designs where the opposite end of the force beam 11 was mechanically attached, any misalignment of the force beam as it is attached would cause a pivot motion of the force beam 11 at the sealing diaphragm 23. This motion is in turn translated by the transmitter 24 to represent a change in differential pressure, thus the resulting output signal is erroneous. This source of error has been eliminated in the design as illustrated by permitting the force beam 11 to move freely within the connecting stem 9. The sphere 12 which is an integral part of the force beam 11, permits the force beam 11 to ride freely in the hole provided in the connecting stem 9 and thus the force beam can compensate for mechanical misalignment during sealing diaphragm 23 response to changes in static pressure.

The symmetrical housing construction relative to the central location of the force beam 11 results in neutralizing the effect of housing expansion on the force beam during extreme changes in static pressure or ambient temperature.

The range of motion of most force-balance systems is a few thousandths of an inch, thus any extraneous movement or non-linearity will result in substantial error in the output signal. Therefore, diaphragm sensitivity to such extraneous movement is a source of error in conventional methods using a single sensing surface because of a diaphragm spring rate. However, in the subject design each capsule consists of a double diaphragm sensing element thereby reducing the overall spring rate as compared to the single diaphragm construction. This reduction in spring rate increases the accuracy of the pressure differential indication by reducing the effect on the output signal caused by extraneous forces resulting from mechanical non-linearity or mechanical expansion due to varying ambient conditions.

Various changes may be made in the details of construction without departing from the spirit and scope of the invention as defined by the appended claims.

What we claim as new and desire to secure by Letters Patent of the United States is:

1. A nesting bellows differential pressure responsive device comprising:
   a housing;
   a partition in said housing thereby providing two chambers in said housing;
   a nesting bellows capsule in each chamber subjected to the pressure therein, said capsules having their adjacent ends anchored to said partition and their remote ends movable, said capsules being filled with an incompressible liquid and being in communication with each other through a passageway in said partition for flow of liquid from one capsule to the other;
   a bar having a high temperature coefficient of expansion extending through said passageway rigidly connecting the remote ends of the capsules to cause them to move in unison in response to a change in the differential between the pressures in their respective chambers and to increase the internal volume of said capsules during an increase in ambient temperature by increasing equally the internal volume of each bellows capsule and reducing internal pressure buildup caused by the incompressible fluid expanding with and increase in ambient temperature; and
   means to transmit the capsule movement to an external transmitter.

2. A nesting bellows differential pressure responsive device as claimed in claim 1 wherein each nesting bellows consists of two expansive surfaces thereby providing means to readily accept an increased volume of incompressible fluid during an increase in ambient temperature or during over-pressure conditions without permanently distorting the expansive surfaces.

3. A nesting bellows differential pressure responsive device as claimed in claim 1 wherein the means to transmit capsule movement to an external transmitter is a force beam which is centrally located between the two nesting bellows capsules with one end of the force beam mechanically attached to a sealing diaphragm and the opposite end in mechanical contact with the connecting bar having the high temperature coefficient by way of a spherical probe on the end of the force beam, said force beam thereby providing means to maintain the force beam in a stationary position when the expansive surfaces of each bellows capsule are caused to displace as a result of internal volume increase of the incompressible fluid during change in ambient temperature thereby reducing signal error caused by fluctuating ambient temperature.

4. A nesting bellows differential responsive device as claimed in claim 1 wherein the force beam being centrally located between the nesting bellows capsules establishes a symmetrical casing about the force beam as a means to compensate for deflections in the pressure casing resulting from changes in static pressure thereby reducing signal error caused by changes in static pressure.

References Cited

UNITED STATES PATENTS

| | | | |
|---|---|---|---|
| 2,627,750 | 2/1953 | Titus | 73—410 |
| 2,906,095 | 9/1959 | Whitehead | 73—393 |
| 3,321,956 | 5/1967 | Ollivier | 73—388 |

S. CLEMENT SWISHER, *Acting Primary Examiner.*

D. E. CORR, *Assistant Examiner.*